United States Patent
Kang (10) Patent No.: US 9,323,386 B2
(45) Date of Patent: Apr. 26, 2016

(54) PEN SYSTEM AND METHOD FOR PERFORMING INPUT OPERATIONS TO MOBILE DEVICE VIA THE SAME

(75) Inventor: Do Hee Kang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 148 days.

(21) Appl. No.: 13/611,248

(22) Filed: Sep. 12, 2012

(65) Prior Publication Data

US 2013/0082976 A1  Apr. 4, 2013

(30) Foreign Application Priority Data

Sep. 29, 2011  (KR) .................. 10-2011-0098818

(51) Int. Cl.
G06F 3/041  (2006.01)
G06F 3/0488  (2013.01)

(52) U.S. Cl.
CPC ............ *G06F 3/0418* (2013.01); *G06F 3/0488* (2013.01)

(58) Field of Classification Search
CPC . G06F 3/0418; G06F 3/0488; G06F 3/03545; G06F 3/044; G06F 2203/04106; G06F 3/046; G06F 3/038; G06F 2203/0381; G06F 3/04883
USPC .................. 345/156, 173–174, 179; 178/18.01–18.03
See application file for complete search history.

(56) References Cited

U.S. PATENT DOCUMENTS

| | | | |
|---|---|---|---|
| 2007/0152976 A1* | 7/2007 | Townsend et al. | 345/173 |
| 2012/0262372 A1* | 10/2012 | Kim et al. | 345/158 |
| 2012/0262407 A1* | 10/2012 | Hinckley et al. | 345/173 |
| 2012/0327042 A1* | 12/2012 | Harley et al. | 345/179 |
| 2013/0009907 A1* | 1/2013 | Rosenberg et al. | 345/174 |

FOREIGN PATENT DOCUMENTS

JP  2011-164746 A  8/2011

* cited by examiner

*Primary Examiner* — Vijay Shankar
*Assistant Examiner* — Abhishek Sarma
(74) *Attorney, Agent, or Firm* — Jefferson IP Law, LLP (57) ABSTRACT

A method and a pen system of performing input operations to a mobile device are provided. The method includes detecting an area touched by a user's hand and coordinates of a location input via a pen, on a touch panel of the mobile device, detecting the user's hand according to the shape of the detected user's hand touch area, compensating the detected pen input coordinates for an error with compensation data, based on the detected user's hand, and displaying the compensated pen input coordinate.

14 Claims, 5 Drawing Sheets

PEN SYSTEM AND METHOD FOR PERFORMING INPUT OPERATIONS TO MOBILE DEVICE VIA THE SAME

PRIORITY

This application claims the benefit under 35 U.S.C. §119(a) of a Korean patent application filed on Sep. 29, 2011 in the Korean Intellectual Property Office and assigned Serial No. 10-2011-0098818, the entire disclosure of which is hereby incorporated by reference.

BACKGROUND OF THE INVENTION

1. Field of the Invention

The present invention relates to input systems for mobile devices. More particularly, the present invention relates to a pen system and a method for performing input operations to a mobile device via the pen system with a relatively high level of precision.

2. Description of the Related Art

Mobile devices have been developed to be equipped with a variety of input systems, e.g., touch screens that include touch panels and display units. Mobile devices with touch screens allow users to perform input operations using their hands, i.e., fingers, or pen systems. The pen systems, according to the related art, are operated based on Electro-Magnetic Resonance (EMR) technology, which is hereinafter also called EMR pens. The EMR pens allow users to easily input/draw text/pictures to/on the mobile devices in a pen touch mode. As a result, pen systems have been developed.

In addition, EMR pen solutions are achieved in such a way that a sensor board detects coordinates of a pen via signals created according to the touch of the pen and the controller extracts the coordinates of the location where the pen is touched via an interpolation and a compensation algorithm.

However, precise coordinates input by an EMR pen of the related art cannot be extracted due to the limitation of the coordinate extracting algorithm. For example, when a user performs an input operation at a location on the touch screen of a mobile device via a pen of the related art, different coordinates for the location may be extracted according to the use features of the user's hand (e.g., right- or left-handed). In this case, the mobile device performs a compensation process for the coordinates input by the use features of the user's hand. To do this, the user must manually set the hand to be used for the operation of a pen, so that the mobile device compensates for coordinates that the user input via the pen. However, manually setting a user's hand to be used for the operation of a pen deteriorates use convenience for mobile devices.

SUMMARY OF THE INVENTION

Aspects of the invention are to address the above-mentioned problems and/or disadvantages and to provide at least the advantages described below. Accordingly, an aspect of the present invention is to provide a pen system and a pen input method that allow a user to easily perform input operations in a mobile device via an Electro Magnetic Resonance (EMR) pen.

Another aspect of the present invention is to provide a pen system and a pen input method that can automatically detect a user's hand using a pen and compensate for coordinates input via the pen.

In accordance with an aspect of the present invention, a method for performing input operations to a mobile device is provided. The method includes detecting an area touched by a user's hand and coordinates of a location input via a pen, on a touch panel of the mobile device, detecting the user's hand according to the shape of the detected user's hand touch area, compensating the detected pen input coordinates for an error with compensation data, based on the detected user's hand, and displaying the compensated pen input coordinate.

In accordance with another aspect of the present invention, a pen system for a mobile device is provided. The system includes a touch panel for creating touch events according to a pen touch and a user's hand touch, a controller for receiving signals corresponding to the touch events from the touch panel, detecting an area touched by the user's hand and coordinates of a location input via a pen, according to the touch events, detecting the user's hand according to the shape of the detected user's hand touch area, and compensating the detected pen input coordinates for an error with compensation data, based on the detected user's hand, and a display unit for displaying the compensated pen input coordinates.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Other aspects, advantages, and salient features of the invention will become apparent to those skilled in the art from the following detailed description, which, taken in conjunction with the annexed drawings, discloses exemplary embodiments of the invention.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, exemplary embodiments of the present invention that provide a pen system and a pen input method for performing input operations via a pen system are described with reference to the accompanying drawings. The same reference numbers are used throughout the drawings to refer to the same or similar parts. Detailed descriptions of well-known functions and structures incorporated herein may be omitted to avoid obscuring the subject matter of the invention.

Exemplary embodiment of the present invention can be applied to any type of device with a touch screen. The device may be a mobile device such as information communication devices, multimedia devices, and their applications, which are operated according to communication protocols corresponding to various types of communication systems. For example, the mobile device can be applied to mobile communication terminals, digital broadcast players, Personal Digital Assistants (PDAs), smartphones, tablet personal computers, a hand-held Personal Computer (PC), and the like.

An increased number of handwriting solutions that employ pen input methods have been developed. When mobile devices employ pen input methods, one of the most important factors to be considered is how precisely the corresponding method allows a user to input a letter or draw a picture at a position that the user wants. To this end, mobile devices must detect the user's hand. When the user performs an input operation to the mobile device via a pen, it is ideal that the pen is perpendicular to the touch screen of the mobile device. However, when the user holds the pen, it is naturally tilted at a certain angle. The tilt angle of the pen differs according to whether the user is right-handed or left-handed. Although a touch by a pen occurs at a location on the touch screen, the pen will be tilted in different angles with respect to the touch screen according to whether it is held by a user that is right-handed or left-handed. In this case, the pen input coordinates are taken into consideration. In order to compensate for the pen input coordinates, the user's hand is set to be used for a pen in a manual method according to the related art, and this inconveniences users. In an exemplary embodiment of the present invention, a pen system and a pen input method automatically detect the user's hand using a pen and compensate for the pen input coordinates.

The pen input coordinates may be extracted in different values according to the tilt of a mobile device. In this case, the extracted coordinates need to be corrected. In an exemplary embodiment of the present invention, a method and system detects the tilt of the mobile device and compensates for coordinates input to the mobile device via a pen based on the mobile device tilt. The level of precision of pen input coordinates extracted from an outer portion in the touch panel is less than from a central portion. This is because the strength of signals used to extract coordinates is weaker in the outer portion than the central portion. That is, the pen detecting points are denser in the central portion of the touch panel than in the outer portion, and thus the strength of signals is stronger in the central portion of the touch panel than in the outer portion. Therefore, the touch error probability is higher in the outer portion than in the central portion in the touch panel. In an exemplary embodiment of the present invention, a method and system is provided for compensating for the detected level of precision in the outer portion. Meanwhile, the user may also draw a picture on the touch screen in such a way that the fingers hold and only move a pen without moving the hand. In this case, the tilt angle of the pen with respect to the touch screen (hereinafter called a pen tilt) varies according to the movement of the fingers. It may also vary according to the posture of holding the pen. Therefore, compensation for the pen input coordinates is required based on the pen tilts. To this end, a method and system are provided that detects a pen tilt and compensates for pen input coordinates. Also a method and system are provided that compensates pen input coordinates via Look Up Tables (LUTs). The LUTs are established based on a user's hands, tilt of mobile devices, pre-set pen input coordinates, pen tilts according to a user's pen using habits, and the like.

Figure 1:
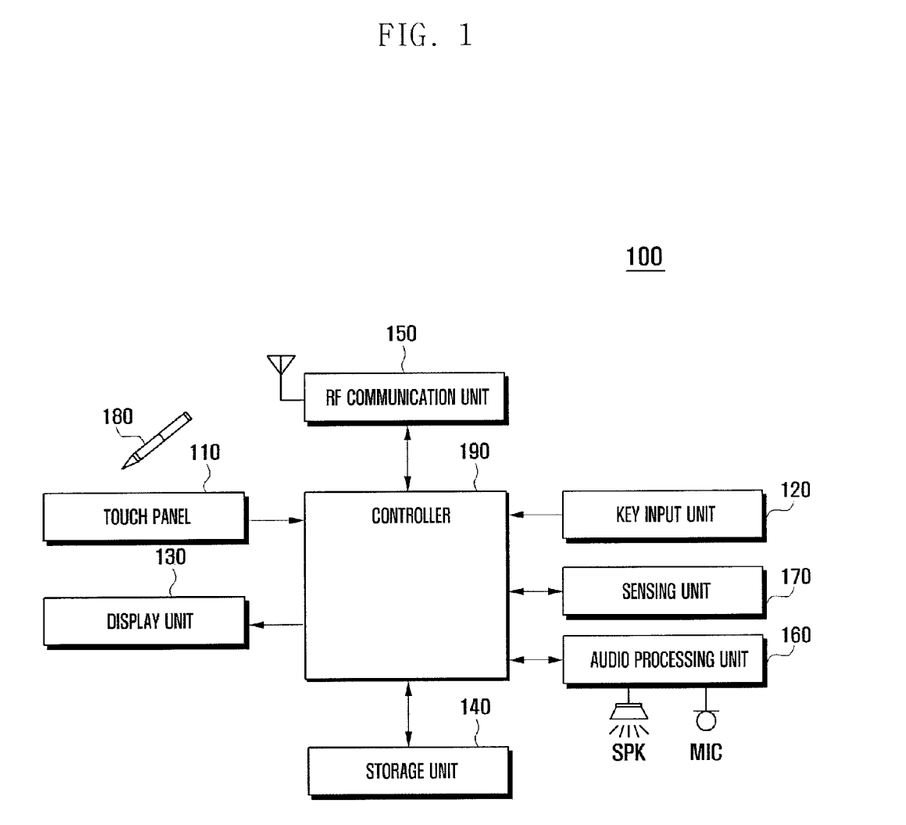
FIG. 1 illustrates a schematic block diagram of a mobile device according to an exemplary embodiment of the present invention.

FIG. 1 illustrates a schematic block diagram of a mobile device according to an exemplary embodiment of the present invention.

Referring to FIG. 1, the mobile device 100 includes a touch panel 110, a key input unit 120, a display unit 130, a storage unit 140, a Radio Frequency (RF) communication unit 150, an audio processing unit 160, a Speaker (SPK), a Microphone (MIC), a sensing unit 170, a pen 180, and a controller 190.

The touch panel 110 is attached onto the display unit 130. The touch panel 110 creates a signal corresponding to a user's touch event and transfers it to the controller 190, so that the controller 190 controls corresponding components according to the signal. For example, when the touch panel 110 detects an alteration in a physical quantity (e.g., capacitance, current, and the like) according to a user's touch via the hand or the pen 180, signals corresponding to a type of touch and the touched input coordinates are transmitted to the controller 190. When the touch panel 110 is implemented with a combination of a capacitance type touch panel and an electromagnetic induction type touch panel, it may be operated in such a way that the capacitance type touch panel detects the user's finger touch and the electromagnetic induction type touch panel detects a touch by the pen 180. There may be various types of touches such as a touch, a tap, a double tap, a press, a drag, a drag and drop, a sweep, and the like. 'Touch' refers to a gesture that presses one point on the screen of touch panel 110. 'Tap' refers to a gesture that strikes gently on one point on the touch panel. 'Double tap' refers to a gesture that briefly successively taps twice on one point on the touch panel. 'Press' refers to a gesture that contacts one point on the touch panel for longer than the 'tap' gesture and then releases it. 'Drag' refers to a gesture that touches one point on the touch panel and then moves to another location without removing the touch. 'Drag' is also called 'scroll.' 'Drag and drop' refers to a gesture that selects a virtual object by grabbing it and dragging it to a different location or onto another virtual object. 'Sweep' refers to a gesture that brushes lightly on the touch panel with the user's finger or an object. 'Sweep' is also called 'flick.' The controller 190 can distinguish 'drag' and 'sweep' via the moving speed of a corresponding object on the touch panel.

The key input unit 120 includes a number of input keys and function keys that receive numbers and letters, and set a variety of functions in the mobile device 100. The function keys include direction keys, side keys, shortcut keys, and the like, which are set to perform specific functions. The key input unit 120 creates key signals, related to a user's settings and function controls of the mobile device 100, and transfers the signals to the controller 190. Examples of the key signals are turning on/off the mobile device 100, adjusting the volume, turning on/off the screen, and the like. The controller 190 controls corresponding components according to the key signals. The key input unit 120 may be implemented with a QWERTY keypad, a 3×4 keypad, a 4×3 keypad, and the like, which includes a number of keys. When the mobile device 100 is designed to include a full touch screen, the key input unit 120 may be implemented as only side keys for turning on/off the screen or the mobile device 100, which are installed on the side of a case of the mobile device 100.

The display unit 130 converts video data from the controller 190 into analog data and displays it. The display unit 130 displays a variety of screens according to the control of the controller 190, e.g., a lock screen, a home screen, an application execution screen, a menu screen, a message writing screen, a call screen, an Internet screen, a keypad screen, and the like. The display unit 130 may be implemented with a flat display panel, such as a Liquid Crystal Display (LCD), an Organic Light Emitting Diode (OLED), an Active Matrix Organic Light Emitting Diodes (AMOLED), and the like. The display unit 130 may also include a three dimensional (3-D) imaging unit that creates an illusion of depth in an image by pressing two offset images separately to the left and right eye of the user. The 3-D imaging technique has been accomplished in stereoscopy and autostereoscopy.

The storage unit 140 stores an Operating System (OS) for the mobile device, application programs required for the operations of the functions according to an exemplary embodiment of the present invention, and data related to the mobile device. The storage unit 140 includes a program storage area and a data storage area.

The data storage area stores data created by the controller 190 when the mobile device 100 is operated. The data storage area stores screens to be displayed on the display unit 130. More particularly, a keypad screen and a menu screen may be implemented in various forms. For example, the keypad screen may be a 3×4 keypad screen or a QWERTY keypad screen. The menu screen may include a key for switching screens, e.g., a return key for returning to a previous screen, a key for controlling a currently executed application, and the like. The data storage area also serves as a buffer that temporarily stores data created when a message, an image, a web page, a document, and the like is copied to be pasted. The data storage area may also store preference values, e.g., screen brightness, a value to determine whether to enable a vibration mode when a touch occurs, a value to determine whether to automatically rotate a screen, and the like. In an exemplary embodiment of the present invention, the data storage area stores at least one Look Up Table (LUT) for compensating for precision of a pen input.

The LUT stores values for compensating for the difference of touch sensitivity between a central portion and an outer portion in the touch panel 110. The central portion of the touch panel 110 creates a higher level of sensitivity of a signal than the outer portion. That is, the outer portion of the touch panel 110 detects a touch as a relatively lower level of intensity than the central portion. Therefore, when the user touches the central portion and the outer portion with a pen, the touch panel may detect a level of precision of the pen touch coordinates in the outer portion that is less than in the central portion. The LUT stores empirical data for compensating for the difference according to the input error between the central portion and the outer portion. The unit of compensation data is a pixel. Compensation is set based on a certain distance, e.g., 2 mm. The compensation data in the LUT may be applied to all coordinates. The LUT may determine the unit of compensation data based on the degree of precision and the user's preference.

The LUT can be created to meet conditions according to use habits of the touch panel. The use habits are the user's hands, pen tilts according to the user's hands, and the like. The pen input coordinates varies according to whether the user is left-handed or right-handed. Therefore, the LUT may be set for a left-handed or a right-handed person. When the user touches the touch panel 110 with the pen 180, the touch panel 110 detects the pen input coordinates as different values according to the pen tilts. That is, although the pen 180 touches the same point on the touch panel 110, the amount of magnetic charges is induced with different values according to whether the pen touches the point perpendicular to the touch panel 110 or with a tilt angle. This causes an error between the location actually touched by the pen 180 and the location that the touch panel 110 determines to be where the pen touch has occurred. The differences can be empirically measured between the pen tilts (e.g., tilted every by 5° with respect to the vertical axis) and the real pen tilt. That is, the LUT stores compensation data for the pen input coordinates by pen tilts.

In an exemplary implementation, a number of LUTs, e.g., N may be determined according to the hand, pen tilts, mobile device tilts, and the like. For example, when the hand is set for a left-handed or a right-handed person, its degree of freedom is 2. When the pen tilt is set from 30° to 150° every 10°, its degree of freedom is 12. Likewise, when the tilt of the mobile device is set to 0° (it lies on the horizontal state), 45° (it leans), and 90° (it tilts up), its degree of freedom is 3. Therefore, the number of the LUT is 72 (=2×12×3). The LUT may be created and stored in the storage unit 140 when the mobile device 100 is manufactured. Alternatively, the LUT may be downloaded from the mobile device manufacturer and stored in the storage unit 140.

The program storage area stores the OS for booting the mobile device 100 and controlling the components in the mobile device 100. The program storage area also stores a number of applications for supporting a variety of user functions, for example, a call function, a web browser for connecting to Internet servers, an audio function for playing audio files, such as Moving Picture Experts Group (MPEG)-1 or MPEG-2 Audio Layer III (MP3) files, an image outputting function for reproducing photographs, a video playback function, and the like. More particularly, the program storage area stores a pen input application. The pen input application includes a number of routines. For example, the routines include detecting pen input coordinates, detecting a user's hand, detecting a pen tilt, transmitting a mobile device tilt, selecting one of the N LUTs based on the detected hand, pen input coordinates, pen tilt, and mobile device tilt, extracting compensation data from the selected LUT, and applying the extracted compensation data to the detected pen input coordinates.

The RF communication unit 150 establishes communication channels for a voice/video call, or data communication such as video or messages, with other communication systems, under the control of the controller 190. The RF communication unit 150 includes an RF transmitter for up-converting the frequency of signals to be transmitted and amplifying the signals, and an RF receiver for low-noise amplifying received RF signals and down-converting the frequency of the received RF signals.

The audio processing unit 160 transfers audio signals, output from the controller 190, to a speaker. The audio processing unit 160 also transfers audio signals such as voice, input via a microphone, to the controller 190. The audio processing unit 160 converts voice/audio data into audible signals and then outputs the signals via a speaker, according to the control of the controller 190. The audio processing unit 160 also converts audio signals such as voice, received via a microphone, into digital signals and then transfers the signals to the controller 190.

The sensing unit 170 detects information related to the mobile device tilt and transfers it to the controller 190. The sensing unit 170 may include an acceleration sensor, a geomagnetic sensor, and the like. The sensing unit 170 converts the amount of physical quantity into an electric signal, so that an Analog/Digital (AD) converter converts the electric signal into data and transfers it to the controller 190.

The pen 180 is an input system for an electromagnetic induction type touch panel. The pen 180 includes a ferrite and a coil, forming a resonance circuit. The resonance circuit resonates according to electromagnetic fields created in the touch panel 110, and creates induction current. The induction current alters the current in the touch panel 110. That is, the touch panel 110 can detect an approach or touch of a pen according to alteration of the current due to the induction current.

The controller 190 controls the entire operation of the mobile device 100 and the signals flowing among the components therein. The controller 190 processes data and executes applications. The controller 190 also controls the electric power supplied to the components from the battery. More particularly, the controller 190 executes the pen input application and compensates for the pen input coordinates. The controller 190 may further include a pen input coordinate compensating unit as illustrated in FIG. 2.

Figure 2:
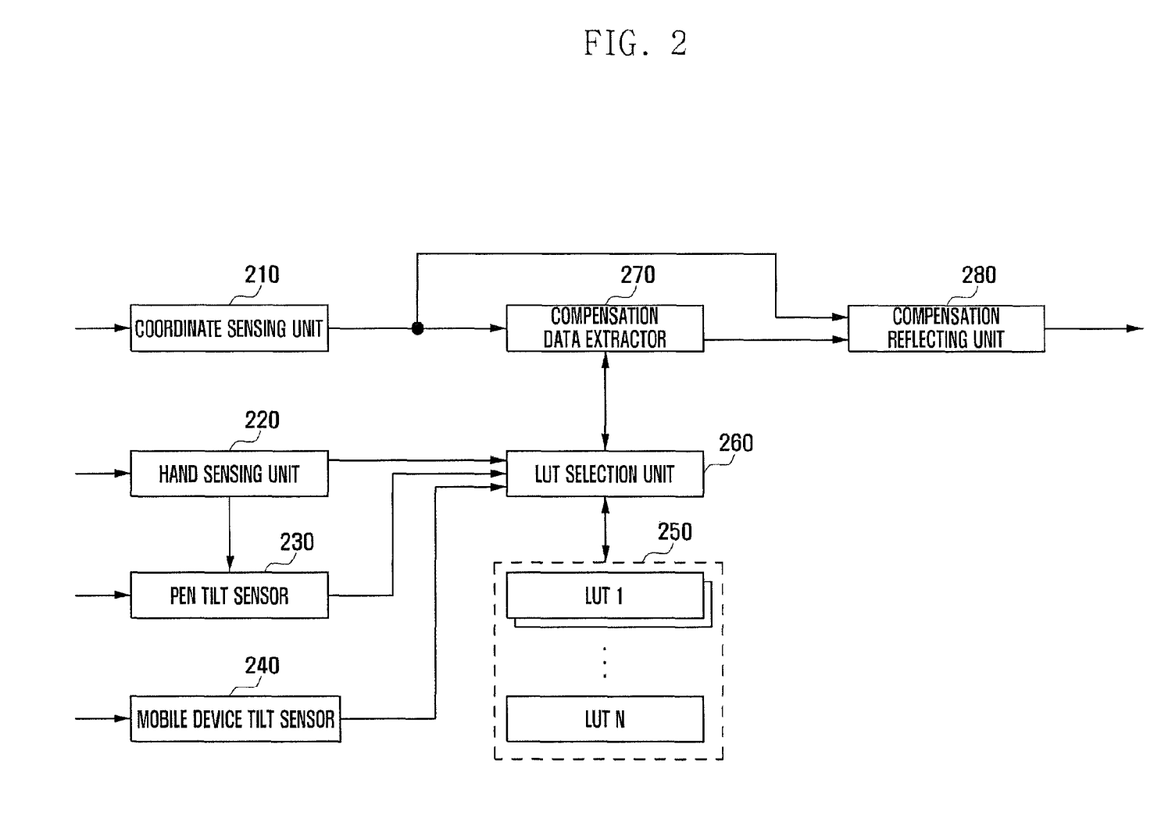
FIG. 2 illustrates a schematic block diagram of a compensation unit for compensating for coordinates input to a touch panel via a pen, according to an exemplary embodiment of the present invention.

FIG. 2 illustrates a schematic block diagram of a compensation unit for compensating for coordinates input to a touch panel via a pen, according to an exemplary embodiment of the present invention.

Referring to FIG. 2, the compensating unit includes a coordinate sensing unit 210, a hand sensing unit 220, a pen tilt sensor 230, a mobile device tilt sensor 240, a LUT DataBase (DB) 250, an LUT selection unit 260, a compensation data extractor 270, and a compensation reflecting unit 280. The compensation unit may be included in the controller 190. Alternatively, the compensation unit may be configured between the touch panel 110 and the controller 190. Herein, it is assumed that the compensation unit is included in the controller 190.

The coordinate sensing unit 210 detects coordinates of a location on the touch panel 110, touched by the pen 180, and outputs the detected pen input coordinates to the compensation data extractor 270 and the compensation reflecting unit 280. The coordinate sensing unit 210 does not process the pen input coordinates, and just transfers it the following components. Therefore, the pen input coordinates, from the coordinate sensing unit 210, may include errors from the coordinates that the user originally wanted to input, due to the user's hand, pen tilt, and the mobile device tilt.

Figure 3:
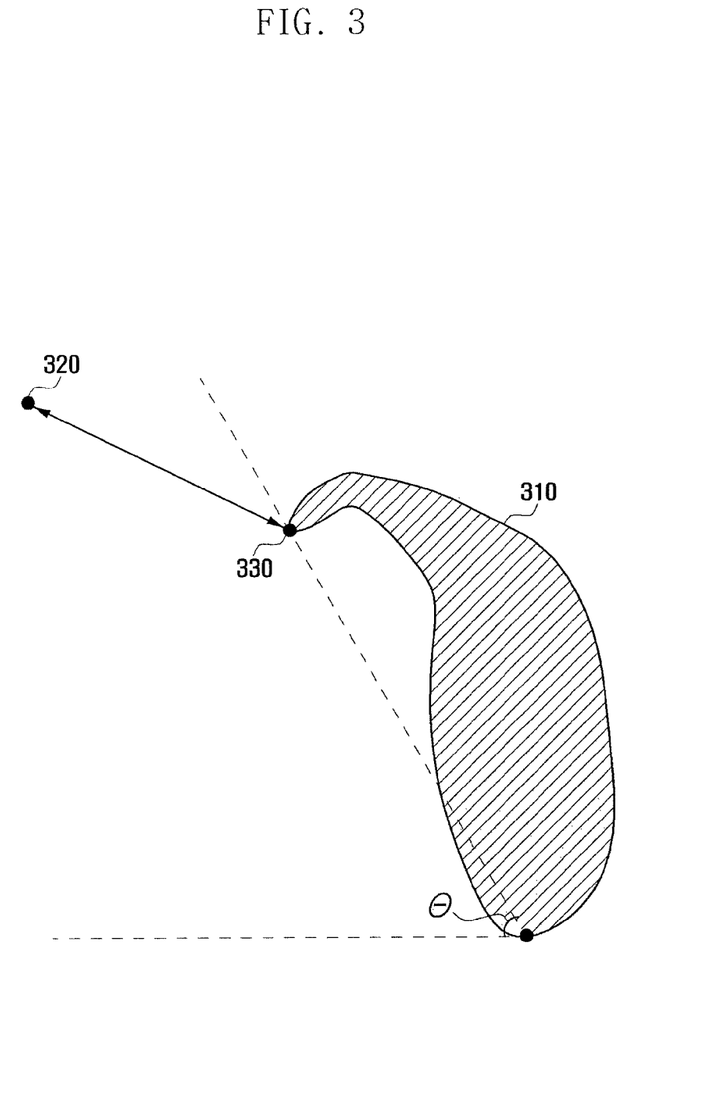
FIG. 3 illustrates a process of detecting a pen tilt, according to an exemplary embodiment of the present invention.

The hand sensing unit 220 detects the area and shape touched by the user's hand, identifies the user's hand based on the shape of the touch area, and outputs the corresponding data to the LUT selection unit 260. When the user contacts the touch panel 110 by the hand holding the pen 180, the shapes of the touch area vary according to whether the hand is a right or left hand. The storage unit 140 stores right-handed and left-handed templates in the data storage area in order to compare the shape of the touch area by the hand. The hand sensing unit 220 compares a shape of a detected touch area with the templates and detects the user's hand. Alternatively, as illustrated in FIG. 3, the hand sensing unit 220 can detect the tilt angle Θ of the touch area with respect to the horizontal direction in order to identify the user's hand more precisely. That is, as illustrated in FIG. 3, when the shape of the touch area is tilted to the left with respect to the virtual vertical axis, the hand sensing unit 220 identifies that the user uses the right hand. Otherwise, the hand sensing unit 220 identifies that the user uses the left hand.

FIG. 3 illustrates a process of detecting a pen tilt, according to an exemplary embodiment of the present invention.

Referring to FIGS. 2 and 3, the pen tilt sensor 230 receives information regarding the user's hand touch area 310 from the hand sensing unit 220. The pen tilt sensor 230 receives the detected pen input coordinates 320 from the coordinate sensing unit 210. The pen tilt sensor 230 sets coordinates in the received hand touch information as a reference point 330. The pen tilt sensor 230 determines a distance between the reference point 330 and the pen input coordinates 320. The pen tilt sensor 230 detects the pen tilt corresponding to the determined distance and outputs it to the LUT selecting unit 260. Since the storage unit 140 has stored pen tilts corresponding to distances in the data storage area, the pen tilt sensor 230 can extract a pen tilt corresponding to the determined distance from the data storage area.

The mobile device tilt sensor 240 detects a tilt of the mobile device 100 and outputs it to the LUT selection unit 260. The tilt of the mobile device 100 may be a value representing a state where the mobile device 100 lies on the horizon direction, where the mobile device 100 leans with a certain angle, or where the mobile device 100 tilts up in the vertical direction. Alternatively, the tilt of the mobile device 100 may be an angle value. The LUT selection unit 260 selects an LUT from the LUT DB 250 according to the detected user's hand, the pen tilt, and the mobile device tilt. The compensation data extractor 270 extracts compensation data for the location corresponding to the detected coordinates from the selected LUT, and outputs it to the compensation reflecting unit 280. The compensation reflecting unit 280 reflects the compensation data to the pen input coordinates detected by the coordinate sensing unit 210, thereby creating error-corrected coordinates.

Although it is not illustrated, the mobile device may selectively include additional components, such as a short-range communication module for short-range wireless communication, a camera module for photographing still images or videos, an interface for wireless or wiredly transmitting/receiving data, an Internet communication module, a digital broadcast module for receiving and reproducing a broadcast, a GPS module, and the like. With the spread of digital convergence, although the types of mobile device modifications are too various to list, it will be appreciated by those skilled in the art that the other components equivalent to the above-listed components may be further included in the mobile device according to an exemplary embodiment of the invention. Also, it will be appreciated that, according to the mobile device purpose, the mobile device may be implemented by omitting a particular component or replacing it with other components.

Figure 4:
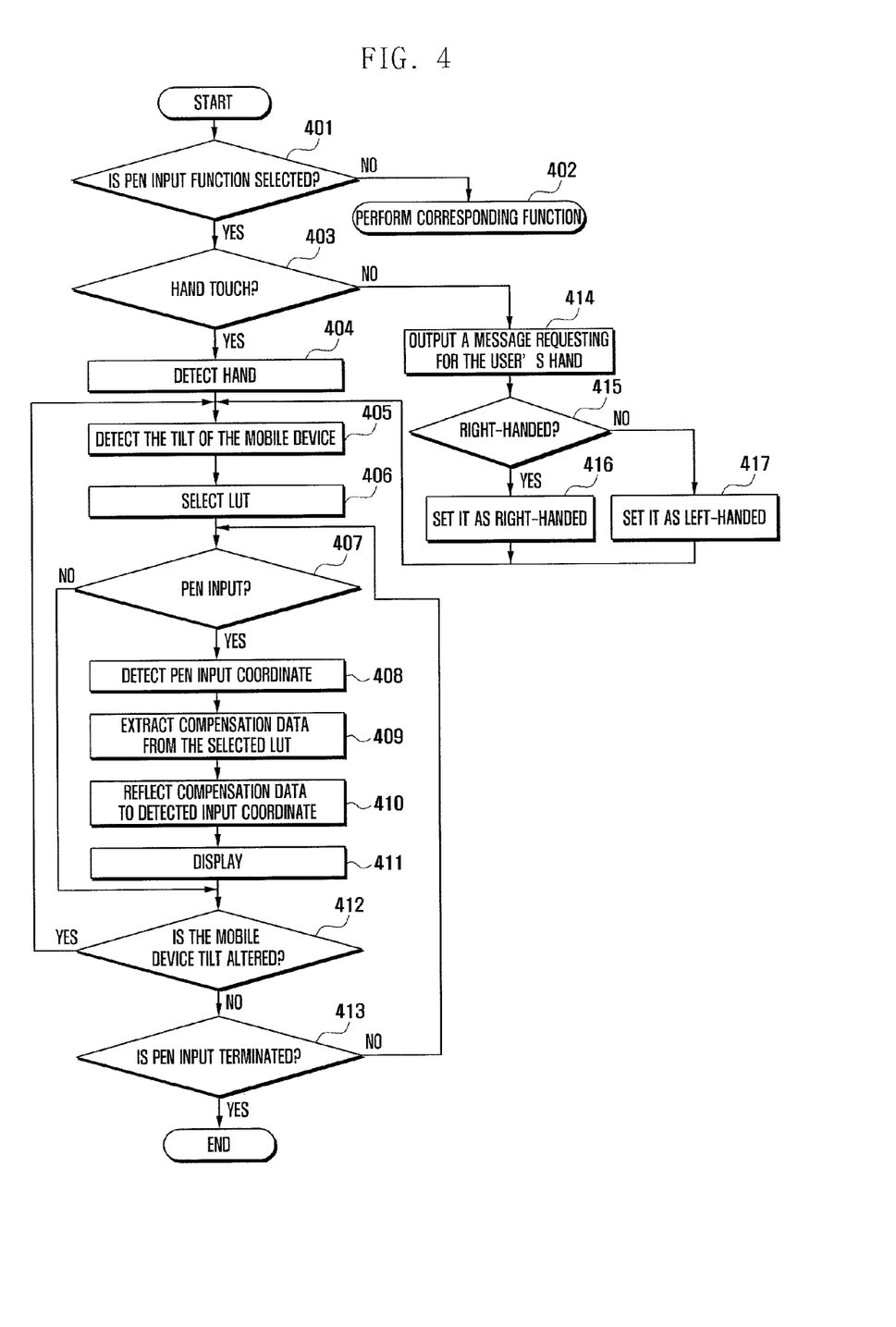
FIG. 4 illustrates a flowchart of a pen input method according to the exemplary embodiment of the present invention.

FIG. 4 illustrates a flowchart of a pen input method according to an exemplary embodiment of the present invention.

Referring to FIG. 4, while the mobile device 100 is operating in an idle state, the controller 190 determines whether a user selects a pen input function at step 401. When the user selects an icon for executing a pen input application such as a graphic edit application, a handwriting recognition application, and the like, the controller 190 executes the pen input function. Alternatively, when the user selects a pen input menu on the menu screen, the controller 190 executes the pen input function. When the user selects a function other than the pen input function at step 401, the controller 190 performs the corresponding function at step 402. Meanwhile, when the controller 190 does not detect a selection for the other functions, it maintains an idle state. When the user selects a pen input function at step 401, the controller 190 determines whether a user's hand touch occurs on the touch panel 110 at step 403.

If it is determined that a user's hand touch occurs on the touch panel 110 at step 403, the controller 190 detects the user's hand at step 404. As described above, the controller 190 identifies whether the right hand or the left hand is used, based on the shape of the user's hand touch area. The controller 190 detects a tilt of the mobile device 100 using the detected information from the sensing unit 170 at step 405. The controller 190 selects an LUT corresponding to the detected information at step 406. That is, the controller 190 selects an optimal LUT from the LUT DB 250 based on the user's hand and the mobile device tilt.

Thereafter, the controller 190 determines whether a touch is made by a pen at step 407. If it is determined that a pen touch is performed at step 407, the controller 190 detects the pen input coordinates by the pen touch on the touch panel 110 at step 408. The controller 190 extracts compensation data corresponding to the pen input coordinates from the selected LUT at step 409. The controller 190 reflects the extracted compensation data to the pen input coordinates and thus creates compensated pen input coordinates at step 410. The controller 190 displays the compensated pen input coordinates on the display unit 130 at step 411. Steps 407 to 411 are repeated each time that a pen touch is performed on the touch panel 110. That is, the controller 190 compensates the pen input coordinate, input to the touch panel 110, for an error with the compensation data, and displays the compensated pen input coordinates on the display unit 130.

When the tilt of the mobile device 100 varies to which the error is reflected, the controller 190 detects an alteration in the mobile device tilt at step 412 and returns to step 405 where a process is performed where an optimal LUT is selected. However, when an LUT does not need a mobile device tilt, the process of selecting an optimal LUT may be omitted. That is, steps 405 and 412 may be omitted, according to the user's preference. When the user inputs a command for terminating the pen input function while the controller 190 is compensating for the pen input coordinates at step 413, the controller 190 terminates the pen input function.

Meanwhile, if it is determined that a user's hand touch does not occur on the touch panel 110 and thus does not detect the touch at step 403, the controller 190 displays a message requesting the user's hand on the display unit 130 at step 414. For example, the controller 190 may display the item on the display unit 130 as shown in Table 1.

TABLE 1

| | |
|---|---|
| ☐ | Right handed |
| ☐ | Left handed |

When the user checks the control box corresponding to the right handed box, the controller 190 detects the checked status at step 415, then sets the hand to hold a pen as the right hand at step 416, and then proceeds to step 405. On the contrary, when the user checks the control box corresponding to the left handed box, the controller 190 detects the checked status at step 415, then sets the hand to hold a pen as the left hand at step 417, and then proceeds to step 405.

Meanwhile, when the controller 190 does not detect a user's hand at step 403, it controls the display unit 130 to display a message requesting the user that he/she contacts his/her hand onto the screen.

Figure 5:
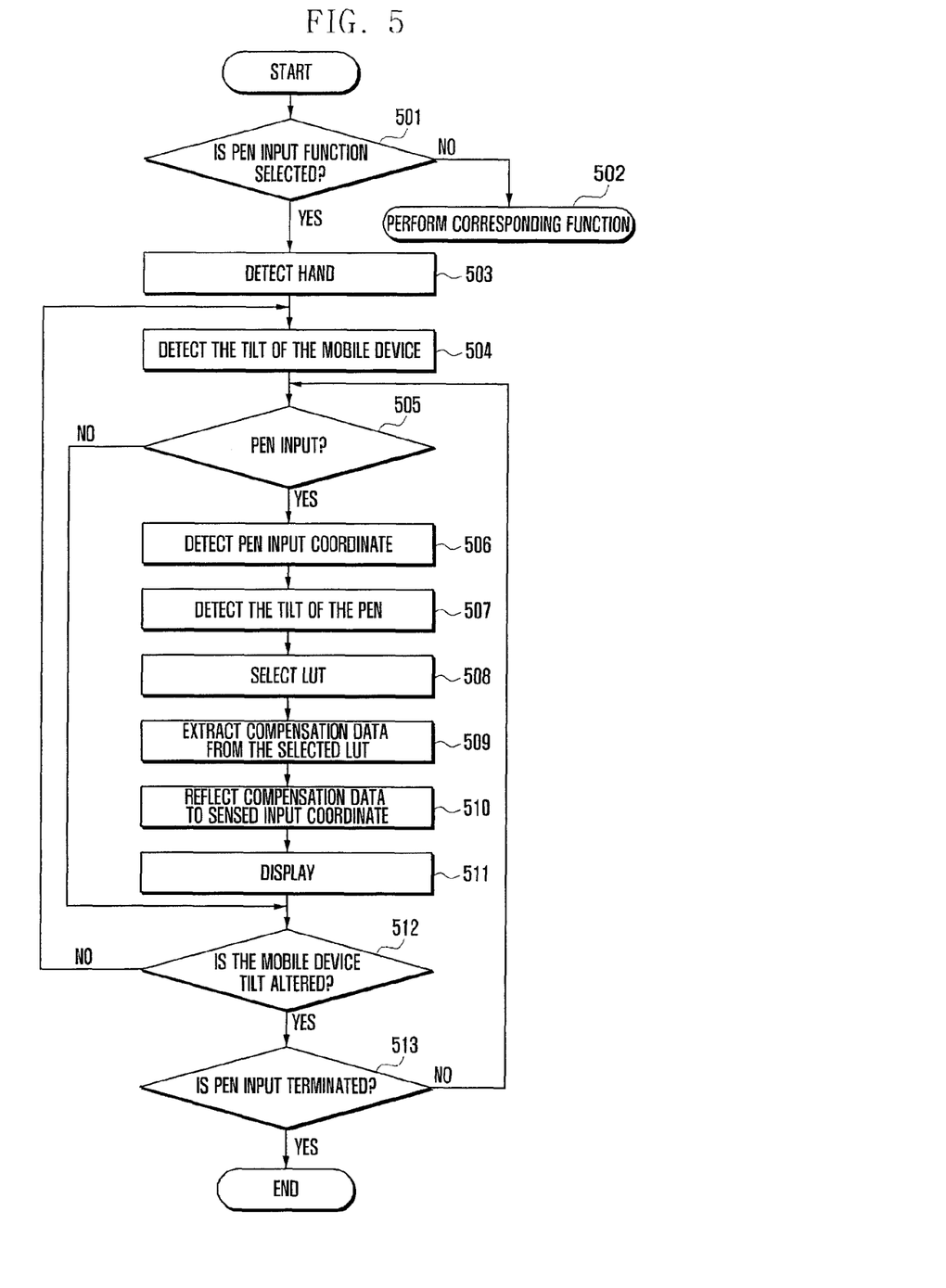
FIG. 5 illustrates a flowchart of a pen input method according to an exemplary embodiment of the present invention.

FIG. 5 illustrates a flowchart of a pen input method according to an exemplary embodiment of the present invention.

Referring to FIG. 5, the controller 190 determines whether the user selects a pen input function at step 501. When the user selects a function other than the pen input function at step 501, the controller 190 performs the corresponding function at step 502. Meanwhile, when the controller 190 does not detect a selection for the other functions, it maintains an idle state. When the user selects a pen input function at step 501, the controller 190 detects the user's hand at step 503 and a tilt of the mobile device 100 at step 504.

The controller 190 determines whether a touch is made by a pen at step 505. If it is determined that a pen touch is performed at step 505, the controller 190 detects the pen input coordinates by the pen touch on the touch panel 110 at step 506. Thereafter, as illustrated in FIGS. 2 and 3, the controller 190 detects a tilt of the pen via the distance between the pen input coordinates and the user's hand touch area at step 507. The controller 190 selects an optimal LUT from the LUT DB 250 according to the detected user's hand, the pen tilt, and the mobile device tilt at step 508. The controller 190 extracts compensation data corresponding to the pen input coordinates from the selected LUT at step 509. The controller 190 reflects the extracted compensation data to the pen input coordinates and thus creates compensated pen input coordinates at step 510. The controller 190 displays the compensated pen input coordinates on the display unit 130 at step 511. Steps 505 to 511 are repeated each time that a pen touch is performed on the touch panel 110. That is, the controller 190 compensates the pen input coordinate, input to the touch panel 110, for an error with the compensation data, and displays the compensated pen input coordinates on the display unit 130.

When the tilt of the mobile device 100 varies to which the error is reflected, the controller 190 detects an alteration in the mobile device tilt at step 512 and then returns to step 504. However, when an LUT does not need a mobile device tilt, the process of selecting an optimal LUT may be omitted. That is, steps 504 and 512 may be omitted, according to the user's preference. When the user inputs a command for terminating the pen input function while the controller 190 is compensating for the pen input coordinates at step 513, the controller 190 terminates the pen input function.

As described above, the pen system and the method for performing input operations via the pen system according to exemplary embodiments of the present invention can correct the error of coordinates input via the pen system based on the user's hand feature. The pen system and pen input method can automatically detect the user's hand, thereby providing convenience in using a mobile device to the user.

As described above, the method for performing input operations in a mobile device via a pen system according exemplary embodiments of the present invention can be implemented with program commands that can be conducted via various types of computers and recorded in computer-readable recording media. The computer-readable recording media contain program commands, data files, data structures, or the like, or a combination thereof. The program commands recorded in the recording media may be designed or configured to comply with the invention or may be software well-known to the ordinary person skilled in the art. The computer-readable recording media includes hardware systems for storing and conducting program commands. Examples of the hardware systems are magnetic media such as a hard disk, floppy disk, a magnetic tape, optical media such as a Compact Disc Read-Only Memory (CD-ROM) and a Digital Video Disc (DVD), Magneto-Optical Media, such as floptical disk, ROM, Random Access Memory (RAM), flash memory, and the like. The program commands include assembly language or machine code complied by a complier and a higher level language interpreted by an interpreter. The hardware systems may be implemented with at least one software module to comply with the invention.

While the invention has been shown and described with reference to certain exemplary embodiments thereof, it will be understood by those skilled in the art that various changes in form and details may be made therein without departing from the spirit and scope of the exemplary embodiments of the invention as defined in the appended claims and their equivalents.

What is claimed is:

1. A pen system for a mobile device, the system comprising:
   a display unit;
   a touch panel, installed to the display unit, configured to create touch events according to a pen touch and a user's hand touch;
   a storage unit configured to store a Look Up Table DataBase (LUT DB) of a number of LUTs corresponding to the user's pen holding habits;
   a mobile device tilt sensor configured to detect a tilt of the mobile device via information detected by a sensing unit; and
   a controller configured to:
      receive signals corresponding to the touch events from the touch panel,
      detect an area touched by the user's hand and coordinates of a location input via a pen, according to the touch events,
      detect the user's hand according to a shape of the detected user's hand touch area,
      select a Look Up Table (LUT) corresponding a tilt of the pen in relation to the mobile device and the tilt of the mobile device from the LUT DB,
      extract compensation data corresponding to the detected pen input coordinates from the selected LUT, and
      compensate the detected pen input coordinates for an error with compensation data,
   wherein the tilt of the mobile device is determined by measuring a change in an angle of back and front surfaces of the mobile device from a horizontal plane to a vertical plane.

2. The system of claim 1,
   wherein the storage unit is further configured to store right-handed and left-handed templates,
   wherein the controller is further configured to compare the shape of the detected user's hand touch area with the templates.

3. The system of claim 1,
   wherein the controller comprises:
      a coordinate sensing unit configured to detect the pen input coordinates on the touch panel according to the pen touch;
      a hand sensing unit configured to detect an area touched by the user's hand on the touch panel, a shape of the detected user's hand touch area, and the user's hand based on the detected shape of the user's hand touch area;
      an LUT selection unit configured to select the LUT corresponding to the detected user's hand from the LUT DB;
      a compensation data extractor configured to extract the compensation data corresponding to the detected pen input coordinates from the selected LUT; and
      a compensation reflecting unit configured to reflect the extracted compensation data to the detected pen input coordinate.

4. The system of claim 3, wherein the pen holding habits comprises at least one of the user's hands and pen tilts according to the user's hands.

5. The system of claim 1, wherein, when the tilt of the mobile device is altered during the compensation, the controller is further configured to reselect an LUT based on the alteration in the detected tilt of the mobile device.

6. The system of claim 3,
   wherein the controller further comprises a pen tilt sensor configured to set a reference point in the detected user's hand touch area, to determine a distance between the detected pen input coordinates and the reference point, and to detect a pen tilt via the determined distance, and
   wherein the LUT selection unit is further configured to select the LUT based on the detected pen tilt.

7. The system of claim 6, wherein, when the pen tilt is altered during the compensation, the controller is further configured to reselect an LUT based on the alteration in the detected pen tilt.

8. The system of claim 1, wherein the touch panel comprises:
   a capacitance type touch panel configured to create a touch event in response to the user's hand touch; and
   an electromagnetic induction type touch panel configured to create a touch event in response to the pen touch.

9. A method for performing input operations to a mobile device, the method comprising:
   detecting an area touched by a user's hand and coordinates of a location input via a pen, on a touch panel of the mobile device;
   detecting the user's hand according to a shape of the detected user's hand touch area;
   detecting a tilt of the mobile device via information detected by a sensing unit,
   selecting a Look Up Table (LUT) corresponding to the detected user's hand from a LUT DataBase (DB) of a number of LUTs corresponding to a tilt of the pen in relation to the mobile device and the tilt of the mobile device;
   extracting compensation data corresponding to the detected pen input coordinates from the selected LUT; and
   compensating the detected pen input coordinates for an error with compensation data,
   wherein the tilt of the mobile device is determined by measuring a change in an angle of back and front surface of the mobile device from a horizontal plane to a vertical plane.

10. The method of claim 9, wherein the detecting of the user's hand comprises:
    comparing the shape of the detected user's hand touch area with right-handed and left-handed templates that are previously stored.

11. The method of claim 9, wherein the pen holding habits comprises at least one of the user's hands and pen tilts according to the user's hands.

12. The method of claim 9, further comprising:
reselecting, when the tilt of the mobile device is altered during the compensation, an LUT based on the alteration in the detected tilt of the mobile device.

13. The method of claim 9, further comprising:
setting a reference point in the detected user's hand touch area;
determining a distance between the detected pen input coordinates and the reference point; and
detecting a pen tilt via the determined distance,
wherein the LUT is selected based on the detected pen tilt.

14. The method of claim 13, further comprising:
reselecting, when the pen tilt is altered during the compensation, an LUT based on the alteration in the detected pen tilt.

* * * * *